United States Patent [19]

Tinetti et al.

[11] Patent Number: 5,473,031
[45] Date of Patent: Dec. 5, 1995

[54] BRANCHED POLYSTYRENE PRODUCTION BY FREE RADICAL BULK POLYMERIZATION

[75] Inventors: Sheila Tinetti; Duane B. Priddy, both of Midland, Mich.

[73] Assignee: The Dow Chemcial Company, Midland, Mich.

[21] Appl. No.: 386,568

[22] Filed: Feb. 10, 1995

[51] Int. Cl.$^6$ .............................. C08F 6/26; C08F 212/08
[52] U.S. Cl. ...................... 526/273; 526/301; 526/307.6; 526/312; 526/318.41; 526/318.42; 526/318.5; 526/347; 528/481; 528/503
[58] Field of Search .................................. 526/273, 307.6, 526/301, 312, 318.41, 318.42, 347, 318.5, 328.5; 528/481, 503

[56] References Cited

U.S. PATENT DOCUMENTS

| | | | |
|---|---|---|---|
| 3,311,583 | 3/1967 | Beardon | 526/318.42 X |
| 4,376,847 | 3/1983 | Matsubara et al. | |
| 5,034,485 | 7/1991 | Tong et al. | |
| 5,072,029 | 12/1991 | Hertler. | |
| 5,073,612 | 12/1991 | Irie et al. | 528/481 X |
| 5,079,322 | 1/1992 | Tong et al. | |
| 5,087,738 | 2/1992 | Tong et al. | |
| 5,191,040 | 3/1993 | Okumura et al. | |
| 5,352,740 | 10/1994 | Ishidoya et al. | |

FOREIGN PATENT DOCUMENTS

| | | | |
|---|---|---|---|
| 1185003 | 3/1970 | United Kingdom | 526/347 |

OTHER PUBLICATIONS

Incorporation of Benzocyclobutene into Polystyrene Allowing Postpolymerizer Chain Extension/Branching, *Macromolecules*, 27, 1307–1312 (1994).

Correlation Between Thermal Dissociation and Chemical Structure of Blocked Isocyanates, *Process in Organic Coatings*, 22, 279–286, (1993).

FTIR and Thermal–Mechanical Cure Characterization of Blocked Isocyanate–Containing Coatings, *Polymer Science and Technology*, 36, 197–213, (1987).

Cycloalkane Perketal Initiators for Styrene Polymerization, *Macromolecules*, 26, 2259–2263, (1993).

Modeling of Free–Radical Polymerization with Cross–Linking: Monoradical Assumption and Stationary State Hypothesis, *Macromolecules*, 26, 3131–3136 (1993).

Synthesis and Applications of Acid–Labile Acrylic Polymers, *Makromol. Chem., Macromol. Symp.*, 64, 137–149 (1992).

*Primary Examiner*—Fred Teskin

[57] ABSTRACT

The present invention is a process for preparing a branched polymer from a vinyl aromatic monomer comprising, copolymerizing the vinyl aromatic monomer with a monomer pair, wherein the monomer pair consists of two different monomers containing functionalities which are substantially nonreactive with each other under the conditions of copolymerization, and heating the copolymer produced to a temperature such that the functionalities react with each other to form branches within the polymer.

12 Claims, No Drawings

BRANCHED POLYSTYRENE PRODUCTION BY FREE RADICAL BULK POLYMERIZATION

The present invention relates to a process for producing a branched polymer from a vinyl aromatic monomer.

BACKGROUND OF THE INVENTION

There are a variety of methods which have been used previously to produce branched polyvinyl aromatics using free radical polymerization. These include the addition of a divinyl monomer, such as divinylbenzene, to the polymerization mixture as described in *Macromolecules*. 1993, 26, pg. 3131; the use of a multifunctional initiator, such as 2,2-bis(4,4-di-t-butylperoxycyclohexyl)propane as described in U.S. Pat. No. 5,191,040; and the use of a vinyl functional initiator, such as n-butyl-t-butylperoxyfumarate as described in U.S. Pat. No. 4,376,847. However, in these methods branching occurs in the polymerization reactor, causing gels to form. Gels build up in the polymerization reactor after extended periods of continuous operation and lead to reactor fouling.

One approach to solving the problem of polymerization reactor fouling is to place latent functionality on the polymer during polymerization, which subsequently reacts to form branches upon thermolysis at temperatures above 200° C., as described in "Incorporation of Benzocyclobutenes into Polystyrene Allowing Postpolymerizer Chain Extension/Branching", *Macromolecules*, 1994, 27, pgs. 1307–1312. In this process the benzocyclobutene (BCB) is incorporated into the polymer chain by initiation with a BCB functional peroxide, resulting in chain extension or branching upon heating at 240° C. However, this approach produces an unstable polymer since the branching of the BCB functionalities is incomplete and can continue upon further thermal processing, thus changing the degree of branching, the molecular weight and polymer properties.

Accordingly, it would be advantageous to produce a stable branched vinyl aromatic polymer by a continuous method that would overcome the foregoing disadvantages of the prior art.

SUMMARY OF THE INVENTION

The present invention is a process for preparing a branched polymer from a vinyl aromatic monomer comprising copolymerizing the vinyl aromatic monomer with a monomer pair, wherein the monomer pair consists of two different monomers containing functionalities which are substantially nonreactive with each other under the conditions of copolymerization, and heating the copolymer produced to a temperature such that the functionalities of the monomer pair react to form branches within the polymer. In this process the branching can occur outside the polymerization zone, thereby eliminating polymerizer fouling and the monomer pair can be reacted completely so as to form a stable polymer.

DETAILED DESCRIPTION OF THE INVENTION

Vinyl aromatic monomers for use according to the present invention include, but are not limited to, those vinyl aromatic monomers known for use in polymerization processes such as those exemplified in U.S. Pat. Nos. 4,666,987, 4,572,819 and 4,585,825. Preferably, the monomer is of the formula:

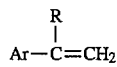

wherein R is hydrogen or methyl, Ar is phenyl, halophenyl, alkylphenyl or alkylhalophenyl, wherein any alkyl group contains 1 to 6 carbon atoms. The term halophenyl refers to a phenyl substituted with one or two halogen atoms, the term alkylphenyl refers to a phenyl substituted with one or two alkyl groups, and the term alkylhalophenyl refers to phenyl substituted with one or two alkyl groups which contain a halogen substituent or to a phenyl substituted with a halogen and an alkyl substituent. More preferably Ar is phenyl or alkylphenyl with phenyl being most preferred. In addition the polymerization may be conducted in the presence of predissolved elastomer to prepare impact modified, grafted rubber containing products, examples of which are described in U.S. Pat. Nos. 3,123,655, 3,346,520, 3,639,522, and 4,409,369.

The monomers which make up the monomer pair are two different monomers having the following characteristics: a) each monomer of the monomer pair contains a vinyl group which copolymerizes with the vinyl aromatic monomer under polymerization conditions, and b) each monomer of the monomer pair contains a functionality which is substantially nonreactive with the functionality of the other monomer in the pair under the conditions of copolymerization, but will react upon further heating to form branches in the polymer produced. A functionality is substantially nonreactive when less than 1 percent of the monomer containing the functionality reacts under copolymerization conditions. Appropriate functional groups which will behave under the conditions set forth include carboxylic acids and epoxides, carboxylic acids and amides, esters and alcohols, and carboxylic acids and alcohols. Examples of such monomer pairs include (meth)acrylic acid and hydroxyethyl(meth)acrylate, (meth)acrylic acid and (meth)acrylamide, and (meth)acrylic acid and glycidyl(meth)acrylate. Most preferably the monomer pair is (meth)acrylic acid and glycidyl(meth)acrylate. Preferably, these monomers are used under copolymerization temperatures of less than about 120° C. At temperatures above 120° C. some branching may occur during the copolymerization.

Alternatively, one or both members of the monomer pair may be a blocked monomer. A blocked monomer contains a functionality which is protected to prevent reaction with functionalities of the other monomer in the pair under copolymerization conditions. Preferably, these monomers are used under copolymerization conditions of about 120° C. to about 160° C. Upon further thermal treatment at about 195° C. or above, the protected functionality will react readily due to the cleavage of the protecting group. The protecting group is preferably thermally labile such that upon heating at a temperature above the copolymerization temperature, the protecting group is cleaved and the functional group remains to react with the functionality of the other monomer in the pair to form branches. Examples of blocked monomers include but are not limited to blocked isocyanates, as described in "Correlation Between Thermal Dissociation and Chemical Structure of Blocked Isocyanates", *Progress in Organic Coatings*, 22 (1993) pgs. 279–286 and "FTIR and Thermal-Mechanical Cure Characterization of Blocked Isocyanate-Containing Coatings", *Polymer Science and Technology*, (1987), 36, pgs. 197–212 and blocked carboxylic acids, as described in "Synthesis and Applications of Acid-Labile Acrylic Polymers", *Makromol.*

*Chem., Macromol Symp.* (1992), 64 (International Symposium on New Polymers, 1991), pgs. 137–49, U.S. Pat. No. 5,072,029, issued to Hertler and U.S. Pat. No. 5,352,740, issued to Ishidoya et al. Preferably, the blocked monomer is a carboxylic acid protected with an vinylether such as 1-butoxyethylacrylate, or an isocyanate protected with an alcohol such as Gee-bloc™ (CAS RN 159949-90-3), ([1-methyl-1 -]3-(1-methylethenyl)-phenyl]ethyl]-t-butyl) carbamate, which is a product of Cytec Industries. Upon thermal treatment above the copolymerization temperature, the ether is cleaved to produce a carboxylic acid, or the alcohol is cleaved to produce an isocyanate, which is free to react with the functionality of the other monomer in the pair.

The amount of the monomer pairs used in the copolymerization will depend upon the desired amount of branching in the polymer produced. In practice it is desirable to have greater than ten times the concentration of one monomer over the other. By incorporating an excess of one monomer, the functional groups of the monomer pair are more likely to find each other within the polymer solution and react accordingly to form branches. The monomer used in excess and the limiting monomer, i.e., the one of least concentration, can be selected according to cost, availability or other considerations. In a preferred embodiment, a stable branched polymer, wherein all the latent functional groups of the limiting monomer have been reacted, can be produced when one monomer of the monomer pair is present at 1000 to 2000 mole percent excess over the limiting monomer.

In general, the amount of limiting monomer is selected such that, on average, less than 0.5 moles of limiting monomer is used per mole of polymer molecules produced in the polymerization. Preferably, the concentration of limiting monomer (in ppm) may be calculated by multiplying the Mw of the limiting monomer by a factor of 0.3 to 4.0. For example, if glycidyl methacrylate (Mw of about 142) is used as the limiting monomer, the concentration could be between about 43 ppm and 568 ppm. In a more preferred embodiment, from about 100 to about 500 ppm of glycidyl methacrylate is used as the limiting monomer.

Optionally, the polymerization can be conducted in the presence of an initiator such as an azo compound or a peroxide. Preferably, the polymerization occurs in the presence of a peroxide initiator such as tertiary butyl peroxybenzoate, tertiary butyl peroxyacetate, ditertiary butyl peroxide, dibenzoyl peroxide, dilauroyl peroxide, 1,1-bis tertiary butyl peroxycyclohexane, 1,1-bis tertiary butylperoxy-3,3,5-trimethyl cyclohexane or di-cumyl peroxide.

The vinyl aromatic monomer, the monomer pair and other optional components are heated to a temperature such that the vinyl aromatic monomers and the monomer pairs copolymerize, but the functional groups of the monomer pair do not substantially react with each other. The copolymerization of the vinyl aromatic monomer and monomer pair is preferably a continuous free-radical bulk polymerization such as described in *Macromolecules*, 26, pg. 2259, 1993.

The temperature of the copolymerization can be any temperature at which copolymerization occurs without significant branching. Typical temperatures range from about 80° C. to about 160° C. The temperature can be selected according to the one hour half life temperature of the selected initiator used in the copolymerization. The one hour half life temperature of the initiator is the temperature at which half of the initiator is consumed after one hour of reaction time. The temperature can be increased over time to give a steady rate of polymerization, since the polymerization rate decreases with increased conversion. Typically, the temperature increases from about 10° C. below the one hour half life temperature of the initiator to about 30° C. above the one hour half life of the initiator over the time of the polymerization reaction. In a preferred embodiment the temperature increases from about 100° C. to about 160° C. at a rate of 10° C. per hour.

Chain transfer solvents, such as ethylbenzene, and chain transfer agents, such as n-dodecylmercaptan or terpinoline, may also be used in the polymerization process.

The copolymerization is conducted for a time sufficient to reach the desired conversion. Typically, the polymerization reaction is conducted from about 5 to about 7 hours.

Typically, the Mw of the polymer produced in the polymerization zone is from about 50,000 to about 300,000.

Upon reaching the desired conversion the copolymer mixture is then heated to a higher temperature which allows the reaction between the functionalities of the monomer pair and therefore branching to occur. The product obtained by the copolymerization reaction comprises the copolymer of the vinyl aromatic monomer and the monomer pair, unreacted monomers, ethylbenzene or other diluent, and other components included in the reaction mixture. Typically, the volatile components of the copolymerization reaction mixture are removed while further reactions occur. In a preferred embodiment, this mixture is sent to a devolatilizer to remove the unreacted monomers and solvents at higher temperatures while the latent functionalities couple and branching occurs. Typical temperatures are from about 220° C. to about 290° C. with approximately 260° C. being most preferred. Temperatures below 220° C. may not give the desired branching effect, while temperatures above 290° C. can cause the polymer to degrade.

The amount of time needed to substantially remove the unreacted monomer and other solvents or volatile components within the polymer melt mixture is typically from about 5 to about 20 minutes.

The branched polymers produced by the process of the present invention are useful in typical applications for branched polymers including foams and films.

The following examples are set forth to illustrate the present invention and should not be construed to limit its scope. In the examples, all parts and percentages are by weight unless otherwise indicated. The polymer weight average molecular weight (Mw) is determined using gel permeation chromatography (GPC) and refers to the Mw of the solids. Number average molecular weight (Mn) is also determined using (GPC).

EXAMPLE I

Branched Polystyrene Using Glycidylmethacrylate (GMA) and Acrylic Acid (AA)

Seven glass ampoules (5 mm×30 cm) are loaded with 2 grams of a mixture of 90 parts styrene and 30 parts ethylbenzene containing 300 ppm GMA, 1600 ppm AA, and 500 ppm 1,1-bis(t-butylperoxy)cyclohexane and sealed under vacuum. The ampoules are then placed in an oil bath and heated from 90° C. to 160° C. over 7 hours at a rate of 10° C. per hour. One ampoule is removed every hour to determine the Mw of polystyrene as measured by GPC before and after devolatilization in a vacuum oven for 20 minutes at 230° C. Results are listed in Table I.

TABLE I

| Time (h) | Mw before Devolatilization | Mw after Devolatilization |
| --- | --- | --- |
| 1 | 99,500 | 301,000 |
| 2 | 105,000 | 322,000 |
| 3 | 110,000 | 351,000 |
| 4 | 121,000 | 402,000 |
| 5 | 135,500 | 450,000 |
| 6 | 154,000 | 501,000 |
| 7 | 185,500 | 509,500 |

The Mw increase before devolatilization indicates that some branching may be occurring during the polymerization. However, upon devolatilization, the drastic increase in Mw indicates the desired branching effect.

EXAMPLE II

Copolymerization of Styrene with Acrylic Acid (AA) and Glycidylmethacrylate (GMA) at 80° C. Without Substantial Branching Five pairs of glass ampoules (5 mm×30 cm) are each loaded with 2 g of styrene monomer and 2000 ppm (based on styrene monomer) of benzoyl peroxide (BPO) initiator. One ampoule from each pair is additionally loaded with 600 ppm GMA and 2400 ppm AA (based on styrene monomer). The ampoules are sealed under vacuum and placed on an aluminum heated block at 80° C. for the times as indicated in Table II. After 1.5, 3, 4.5, 6, and 16 hours, one pair of ampoules is removed from the heat. The tubes are opened and the percent solids is determined gravimetrically by evaporation of unreacted monomer and solvent. The polymer weight average molecular weight (Mw) and z-average molecular weight ((Mz) as defined in *Textbook of Polymer Science* by Fred W. Billmeyer Jr., pg. 76), are determined for each tube using gel permeation chromatography (GPC) and the polydispersity (Mw/Mn) is also calculated. The results are listed in Table II.

TABLE II

| Time | 0 PPM GMA 0 PPM AA | | | | 600 PPM GMA 2400 PPM AA | | | |
| --- | --- | --- | --- | --- | --- | --- | --- | --- |
| (h) | Mw | Mz | % S[1] | PD[2] | Mw | Mz | % S | PD |
| 1.5 | 173,000 | 326,000 | 16 | 1.84 | 181,000 | 349,000 | 22 | 1.85 |
| 3.0 | 163,000 | 260,000 | 32 | 1.75 | 174,000 | 297,000 | 34 | 1.82 |
| 4.5 | 173,000 | 270,000 | 46 | 1.77 | 180,000 | 287,000 | 41 | 1.83 |
| 6.0 | 187,000 | 291,000 | 51 | 1.78 | 200,000 | 318,000 | 54 | 1.86 |
| 16.0 | 350,000 | 613,000 | 98 | 2.35 | 377,000 | 651,000 | 99+ | 2.30 |

[1] % S refers to the percent solids
[2] PD refers to the polydispersity

The polydispersity value for the copolymer is very close to the value for polystyrene, therefore showing that copolymerization occurs without substantial branching. This copolymer can now be heated to a temperature above 200° C. to produce a branched copolymer.

EXAMPLE III

Branching of Polystyrene Copolymerized With One Protected Monomer (1-Butoxyethylacrylate (BEA)), and Glycidylmethacrylate (GMA)

Preparation of 1-Butoxyethylacrylate (BEA)

N-butylvinyl ether (BVE) and acrylic acid (AA) are dried over 3A molecular sieves. Two moles of BVE and one mole of AA are mixed and allowed to stand at 25° C. under dry nitrogen for 7 days. The excess BVE is evaporated under a stream of nitrogen to give crude BEA. The unreacted AA is removed by passing the mixture through a column of neutral alumina to give BEA.

Copolymerization of BEA with Styrene and Subsequent Deprotection 500 ppm (based on styrene monomer) 1,1-bis(t-butylperoxy)cyclohexane is added to a mixture of 15 parts of BEA and 85 parts styrene. This mixture is loaded into a glass ampoule (5 mm×30 cm) and the ampoule is sealed under vacuum. The ampoule is heated in an oil bath at 130° C. for 2 hours. To purify the polymer for weight loss analysis the contents of the ampoule is dissolved in methylene chloride and the polymer precipitated by the addition of methanol. The precipitated polymer is redissolved in methylene chloride and reprecipitated by the addition of methanol. The doubly precipitated polymer is placed in a vacuum oven at 70° C. for 16 hours. The dry purified polymer is analyzed using 13C-NMR and the copolymer is found to contain 79.5 percent by weight styrene and 20.5 percent by weight of BEA. The polymer is analyzed using Thermal Gravimetric Analysis-Mass Spectroscopy (TGA-MS). The polymer sample is heated at a rate of 10° C./min. The weight remains constant until the temperature reaches 195° C. Between 195° C. and 250° C. the polymer loses 12 percent of its original weight. The mass spec shows that the weight loss is due to the evolution of BVE.

Branching Using GMA/BEA

Seven glass ampoules (5 mm×30 cm) are loaded with 2 grams of a mixture of 90 parts styrene and 30 parts ethylbenzene containing 300 ppm GMA, 3800 ppm BEA, and 500 ppm 1,1-bis(t-butylperoxy)cyclohexane and sealed under vacuum. The ampoules are then placed in an oil bath and heated from 90° C. to 160° C. over 7 hours at a rate of 10° C. per hour. One ampoule is removed every hour to determine the Mw of polystyrene as measured by GPC before and after devolatilization in a vacuum oven for 20 minutes at 230° C. Results are listed in Table III.

TABLE III

| Time (h) | Mw before Devolatilization | Mw after Devolatilization |
| --- | --- | --- |
| 1 | 95,000 | 290,500 |
| 2 | 95,000 | 299,500 |
| 3 | 97,000 | 330,000 |
| 4 | 96,000 | 351,500 |
| 5 | 93,000 | 400,500 |
| 6 | 95,000 | 449,000 |
| 7 | 92,000 | 488,000 |

The data clearly shows the polystyrene Mw in the undevolatilized syrup remains constant during polymerization, which indicates the absence of branching, while the Mw increases drastically after devolatilization indicating that branching has occurred.

What is claimed is:

1. A process for preparing a branched polymer from a vinyl aromatic monomer, comprising copolymerizing the vinyl aromatic monomer with a monomer pair, wherein the monomer pair consists of two different vinyl monomers containing functionalities which are substantially nonreactive with each other under the conditions of copolymerization, such that one monomer of the monomer pair is a limiting monomer, present at a concentration in ppm of from about 0.3 to 4 times the molecular weight of the limiting monomer, and the other monomer of the monomer pair is present in an amount greater than ten times the concentration of the limiting monomer and heating the copolymer produced to a temperature such that the functionalities react with each other to form branches within the polymer.

2. The process of claim 1 wherein the vinyl aromatic monomer is styrene.

3. The process of claim 1 wherein the monomer pair is a carboxylic acid and an epoxide, a carboxylic acid and an amide, an ester and an alcohol or a carboxylic acid and an alcohol.

4. The process of claim 3 wherein the monomer pair is (meth)acrylic acid and hydroxyethyl(meth)acrylate, (meth)acrylic acid and (meth)acrylamide, or (meth)acrylic acid and glycidyl(meth)acrylate.

5. The process of claim 4 wherein the monomer pair is (meth)acrylic acid and glycidyl(meth)acrylate.

6. The process of claim 5 wherein glycidyl(meth)acrylate is present at 100 to 500 ppm based on vinyl aromatic monomer.

7. The process of claim 1 wherein one monomer of the monomer pair is present in excess of 1000 to 2000 mole percent over the other monomer of the monomer pair, said other monomer being the limiting monomer.

8. The process of claim 1 wherein one of the monomers in the pair is a blocked monomer.

9. The process of claim 8 wherein the blocked monomer is a blocked carboxylic acid or a blocked isocyanate.

10. The process of claim 9 wherein the blocked monomer is 1-butoxyethylacrylate or ([1-methyl-1-[3 -(1-methylethenyl)-phenyl]ethyl]-t-butyl) carbamate.

11. The process of claim 1 wherein the copolymerization is conducted at a temperature from about 80° C. to about 160° C.

12. The process of claim 1 wherein the copolymer is heated to a temperature from about 220° C. to about 290° C. to form branches within the polymer.

* * * * *